(12) United States Patent
Alhooshani et al.

(10) Patent No.: US 9,352,297 B2
(45) Date of Patent: May 31, 2016

(54) METHODS FOR PREPARING COMPOSITES OF ACTIVATED CARBON/ZINC OXIDE AND ACTIVATED CARBON/ZINC OXIDE/NICKEL OXIDE FOR DESULFURIZATION OF FUELS

(71) Applicants: King Fahd University of Petroleum and Minerals, Dhahran (SA); King Abdulaziz City for Science and Technology, Riyadh (SA)

(72) Inventors: Khalid R. Alhooshani, Dhahran (SA); Abdullah A. Al Swat, Dhahran (SA); Tawfik A. Saleh, Dhahran (SA); Mohammad N. Siddiqui, Dhahran (SA)

(73) Assignees: King Fahd University of Petroleum and Minerals, Dhahran (SA); King Abdulaziz City for Science and Technology, Riyadh (SA)

( * ) Notice: Subject to any disclaimer, the term of this patent is extended or adjusted under 35 U.S.C. 154(b) by 205 days.

(21) Appl. No.: 14/092,295

(22) Filed: Nov. 27, 2013

(65) Prior Publication Data

US 2015/0148581 A1    May 28, 2015

(51) Int. Cl.
*B01J 21/18* (2006.01)
*B01J 23/06* (2006.01)
(Continued)

(52) U.S. Cl.
CPC ...... *B01J 20/20* (2013.01); *B01J 20/06* (2013.01); *B01J 20/28059* (2013.01);
(Continued)

(58) Field of Classification Search
CPC .......... B01J 23/06; B01J 23/80; B01J 23/755; B01J 20/0244; B01J 20/0225; B01J 20/28057; B01J 20/28059; B01J 20/28071; B01J 20/28073; B01J 20/28085; B01J 21/18; C10G 17/00; C10G 45/00
USPC ............. 502/183, 185, 417; 208/208 R, 244, 208/247, 299
See application file for complete search history.

(56) References Cited

U.S. PATENT DOCUMENTS 2,411,726 A * 11/1946 Holroyd ................. C07C 5/367
    208/93
5,948,398 A * 9/1999 Hanamoto ................ A61L 9/01
    424/76.1

(Continued)

FOREIGN PATENT DOCUMENTS

JP    2003-268386    9/2003
JP    3943902    4/2007

(Continued)

OTHER PUBLICATIONS

J. Chaichanawong, et al. "Adsorptive Desulfurization of Bioethanol using Activated Carbon Loaded with Zinc Oxide", Chemical Engineering Journal, vol. 165, Issue 1, pp. 218-224. (Nov. 15, 2010) (Abstract).

(Continued)

*Primary Examiner* — Patricia L Hailey
(74) *Attorney, Agent, or Firm* — Oblon, McClelland, Maier & Neustadt, L.L.P.

(57) ABSTRACT

Activated carbon\nickel oxide\zinc oxide (AC\NiO\ZnO) and activated carbon\zinc oxide (AC\ZnO) were prepared and used as adsorbents for removal of thiophene, benzothiophene (BT) and dibenzothiophene (DBT) as sulfur compounds from hydrocarbon materials such as diesel fuel. The materials exhibited an efficient and economical way for removing sulfur compounds due to its low-energy consumption, ambient operation temperature and atmospheric pressure. A simple regeneration method of the spent adsorbents.

15 Claims, 8 Drawing Sheets

(51) Int. Cl.
*B01J 23/80* (2006.01)
*B01J 23/755* (2006.01)
*C10G 17/00* (2006.01)
*C10G 45/00* (2006.01)
*B01J 20/20* (2006.01)
*B01J 20/30* (2006.01)
*B01J 20/06* (2006.01)
*B01J 20/28* (2006.01)
*C10G 25/00* (2006.01)

(52) U.S. Cl.
CPC ..... *B01J 20/28073* (2013.01); *B01J 20/28085* (2013.01); *B01J 20/3078* (2013.01); *B01J 20/3085* (2013.01); *C10G 25/003* (2013.01); *C10G 2300/202* (2013.01)

(56) References Cited

U.S. PATENT DOCUMENTS

| | | | |
|---|---|---|---|
| 5,997,829 A * | 12/1999 | Sekine | B01D 53/02 210/749 |
| 7,101,417 B2 * | 9/2006 | Graham | B01D 39/2055 423/230 |
| 8,021,540 B2 * | 9/2011 | Toida | B01J 23/30 208/219 |
| 2003/0100445 A1 * | 5/2003 | Ueda | B01J 20/20 502/182 |
| 2015/0182946 A1 * | 7/2015 | Alhooshani | B01J 20/3078 208/244 |

FOREIGN PATENT DOCUMENTS

| | | |
|---|---|---|
| WO | 2005/073348 | 8/2005 |
| WO | 2009/061072 | 5/2009 |
| WO | 2013/011312 | 1/2013 |

OTHER PUBLICATIONS

Byrappa, et al. "Impregnation of ZnO onto Activated Carbon under Hydrothermal Conditions and its Photocatalytic Properties", Journal of Materials Science, vol. 4, Issue 5, p. 1355. (Mar. 2006) (Abstract).

* cited by examiner

METHODS FOR PREPARING COMPOSITES OF ACTIVATED CARBON/ZINC OXIDE AND ACTIVATED CARBON/ZINC OXIDE/NICKEL OXIDE FOR DESULFURIZATION OF FUELS

BACKGROUND OF THE INVENTION

1. Technical Field

The present invention relates to an activated carbon/NiO/ZnO and an activated carbon/ZnO composite, a method in which the composites are obtained, and a method in which the composites are used as adsorbents in a method of desulfurization of diesel fuel.

2. Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The demand for transportation fuels has been increasing in most countries for the past two decades, and the diesel fuel demand is expected to increase significantly in the early part of the 21st (A. Brady, Buoyant Later Next Decade, *Oil Gas J.*, 97, 75-80, 1999-incorporated herein by reference in its entirety). The main goal of policymakers is to produce transportation fuels that have a sulfur content below 10 parts per million (ppm). The next step, which has already begun in a number of countries, is the extension of stricter sulfur specifications beyond on-road transportation to other products, particularly fuel oil, marine bunkers and jet fuel (OPEC Secretariat, Helferstorferstrasse 17 A- 1010 Vienna, Austria, 2011 www.opec.org—incorporated herein by reference in its entirety). Sulfur compounds present in fuels lead to the emission of sulfur oxide gases (SOx). These gases react with water in the atmosphere to form sulfates and acid rain which damages buildings, destroys automotive paint finishes, acidifies soil, and ultimately leads to loss of forests and various other ecosystems (W. L. Fang, Inventory of U.S. 1990-2003, Clean Air Markets Division, 2004.—incorporated herein by reference in its entirety).

Traces of sulfur present in diesel fuels also poison the catalysts in the emission control system and reduce their effectiveness for the oxidation of harmful carbon monoxide, hydrocarbons and volatile organic matter. Sulfur emissions also cause several human health concerns such as, respiratory illnesses, aggravate heart disease, trigger asthma, and contribute to formation of atmospheric particulates (V. C. Srivastava, RSC Advances, 2, 759-783, 2012—incorporated herein by reference in its entirety), global warming and water pollution (S. F. Vernier, EU environmental laws impact fuels' requirements, Hydrocarbon Process, 79, 51-71, 2000.—incorporated herein by reference in its entirety). Environmental regulations have been introduced in many countries around the world to reduce the sulfur content of diesel fuel to ultra-low levels of 10 ppm with the aim of lowering the diesel engine's harmful exhaust emissions and improving air quality (US EPA, EPA420-F-99-011, Office of Mobile Sources, May 1999.—incorporated herein by reference in its entirety). Therefore, desulfurization of fuels is extremely important in the petroleum industry and there is a need to research new desulphurization methods which are cost effective, more efficient and can meet the environmental regulations and refining requirements.

The current industrial method for removal of sulfur from fuels is (HDS), for reducing of organic-sulfur in gasoline, diesel and other intermediate distillates where $Co$—$Mo/Al_2O_3$ or $Ni$—$Mo/Al_2O_3$, $Ni$—$W/Al_2O_3$ is used as the catalysts for the conversion of organic sulfur to $H_2S$. This process successfully removes many sulfur compounds such as thiols, sulfides, disulfides and some thiophene derivatives, but to much lower extent removes dibenzothiophene derivates due to the steric hindrance on the sulfur atom (refractory organosulfur compounds), such as dibenzothiophene (H. Schulz, et al., Fuel Process Technol., 61, 5-41, 1999; H. Schulz, et al., Catal. Today, 49, 87-97, 1999—each incorporated herein by reference in its entirety).

Adsorption is often employed to remove trace impurities, such as the removal of trace amounts of aromatics from aliphatic (R. T. Hernandez et al., US patent 2004/0040891 US 2004/0044262 A1. 2004—incorporated herein by reference in its entirety) and it is the most common HDS alternative method currently used to achieve ultra-clean fuels (M. Tymchyshyn, Lakehead University, 2008.—incorporated herein by reference in its entirety). Adsorptive desulfurization using porous materials is considered to be an efficient and economical way for removing organosulfur compounds due to its low-energy consumption, the ambient operation temperature and atmospheric pressure without using pressurized hydrogen gas and the availability of regeneration of the spent adsorbent and broad availability of adsorbents (Q. Wang, et al., Fuel Processing Technology, 90, 381-387, 2009.—incorporated herein by reference in its entirety). Activated carbon (AC) is one of the most important adsorbents dominating the commercial use of adsorption due to its porous structure with high surface area, large pore volume and they have high efficiency for the adsorption of various types of compounds (M. Suzuki, Adsorption Engineering, Kodansha Ltd., Tokyo, 1990.—incorporated herein by reference in its entirety). It was found that activated carbon was the best adsorbent between the activated alumina and nickel-silica alumina to remove model sulfur compounds from n-hexadecane (J. H. Kim, et al., *Catal. Today*, 111, 74-83, 2006—incorporated herein by reference in its entirety).

Salem and Hamid (K. Tang, et al., *Fuel processing Technology*, 89, 1-6, 2008-incorporated herein by reference in its entirety) studied removing of sulfur from naphtha with a 550 ppm initial sulfur level in a batch reactor using activated carbon, zeolite 5A, and zeolite 13X as solid adsorbents. They reported that, Activated carbon showed the highest capacity, but a low level of sulfur removal. Activated carbon was found to have much better adsorption characteristics than 13X type zeolite (M. Muzica, et al., *Chemical engineering research and design*, 88, 487-495, 2010—incorporated herein by reference in its entirety). Bu et al. Studied the Adsorptive affinity of polycyclic aromatic sulfur heterocycles (PASHs) and polycyclic aromatic hydrocarbons (PAHs) on commercial activated carbons AC1- to AC7. They concluded that the adsorption selectivity increases as follows: naphthalene<fluorene<dibenzothiophene<4,6-dimethyl dibenzothiophene<anthracene<phenanthrene (J. Bu et al., *Chemical Engineering Journal*, 166, 207-217, 2011—incorporated herein by reference in its entirety).

Granular activated carbon (GAC) was produced from dates' stones by chemical activation using $ZnCl_2$ as an activator. GAC samples were used in desulfurization of a model diesel fuel composed of n-decane and dibenzothiophene (DBT) as sulfur containing compound. More than 86% of DBT is adsorbed in the first 3 h which gradually increases to 92.6% in 48 h and no more sulfur is removed thereafter (Y. A. Alhamed, et al., Fuel, 88, 87-94, 2009—incorporated herein by reference in its entirety).

Study was employed for sulfur removal from model oil (dibenzothiophene; DBT dissolved in iso-octane) using commercial activated carbon (CAC) as an adsorbent. The highest removal of sulfur by CAC was obtained with adsorbent dosage 20 g/L, time of adsorption 6 h, and temperature 308° C.) (D. R. Kumar, et al., *Air, Water,* 40, 545-550, 2012-incorporated herein by reference in its entirety).

Recently, four types of carbons (activated carbon, Maxsorb superactivated carbon, mesoporous templated carbon CMK-3, and graphene) were investigated as selective sorbents for adsorption of thiophene from its solution in n-octane.

The adsorption capacities for thiophene followed the order: graphene>CMK-3>Maxsorb>AC. Surface area is not a critical factor influencing sulfur capacity of carbon sorbents in addition, the carbene-type zigzag edge sites and the carbyne-type armchair edge sites on graphene are among the possible sites for strong interactions with thiophene (L. Wang et al., *AIChE Letter: Separations: Materials, Devices and Processes,* 59, 29-32, 2013—incorporated herein by reference in its entirety).

Modifications of carbon surfaces by incorporation of metals and oxidation of carbon surface can have a positive effect on the adsorption of DBTs. Jiang et al found that, the modified activated carbon by concentrated $H_2SO_4$ at 250° C. has much higher adsorption capacities for dibenzothiophene than the unmodified AC but less adsorption capacities for small molecules (e.g., iodine) (Z. Jiang, et al., *Langmuir,* 19, 731-736, 2003—incorporated herein by reference in its entirety). It was also reported that cobalt and copper loaded carbons showed the highest uptake, due to not-well defined catalytic synergistic effects (C. O. Ania, et al., *Carbon,* 44, 2404-2412, 2006—incorporated herein by reference in its entirety). Adsorption Desulphurization of Gasoline by Silver loaded onto modified Activated Carbons was studied by Cao, et al. The results showed that silver formed π-complexes with organic sulphides; the higher the silver loading, the greater the amount adsorbed, but the adsorption selectivity was poor (B. Cao, et al., *Adsorpt. Sci. Technol.,* 26, 595-609, 2008—incorporated herein by reference in its entirety).

The adsorption of benzothiophene and dibenzothiophene on transition-metal ionimpregnated activated carbons is investigated (Xiao et al., *Energy & Fuels,* 22, 3858-3863, 2008—incorporated herein by reference in its entirety) and the equilibrium amounts adsorbed of BT and DBT on the modified ACs followed the order: AgI/AC>NiII/AC>CuII/AC>ZnII/AC>AC>FeIII/AC. Zhou et al, reported that $HNO_3$ oxidation of AC was an effective method for improving adsorption performance of sulfur compounds, due to an increase in the acidic oxygen-containing functional groups, suggesting that the adsorption of sulfur compounds over the AC may involve an interaction of the acidic oxygencontaining groups on AC with the sulfur compounds (A. Zhou, et al., *Appl. Catal., B,* 87, 190-199, 2009—incorporated herein by reference in its entirety). Two commercially available activated carbons A and B and modified forms of the same by $HNO_3$ treatment and Ni supported systems were used as adsorbents for, 4-methylbenzothiophene and 4,6-dimethyldibenzothiophene in Adsorptive desulfurization (ADS) process. The results showed that, the trend for adsorption selectivity for various adsorbents increases in the order, carbon A (modified)>carbon B (modified)>Ni/carbon A>Ni/carbon B>Ni/silica>Ni/alumina>Ni/HY-zeolite (V. Selvavathi et al., *Catalysis Today,* 141, 99-102, 2009—incorporated herein by reference in its entirety). Zirconium dioxide was impregnated into a commercial activated carbon (AC) and tested as adsorbents for dibenzothiophene (DBT) from a model diesel fuel. The results indicated that surface acidic sites on the impregnated $ZrO2$ may play an important role in the improved desulphurization performance of the composite (L. Xiong, et al., *Adsorpt. Sci. Technol.,* 28, 341-350, 2010—incorporated herein by reference in its entirety). Cerium-loaded activated carbon was tested for dibenzothiophene adsorption from model fuels. This adsorbent showed much better adsorption capacity and selectivity towards DBT than the virgin carbon due to the changes in surface chemistry of the adsorbent, in which the increased acidic sites and cerium ion may play important roles (L. Xiong, et al., *Porous Mater* 19, 713-719, 2012—incorporated herein by reference in its entirety).

The need for cleaner burning fuels has resulted in a continuing world-wide effort to reduce sulfur levels in hydrocarbon-containing fluids such as gasoline and diesel fuels. The reduction of sulfur in such hydrocarbon-containing fluids is considered to be a means for improving air quality because of the negative impact the sulfur has on the performance of sulfur-sensitive items such as automotive catalytic converters. The presence of oxides of sulfur in automotive engine exhaust inhibits and may irreversibly poison noble metal catalysts in the converter. Emissions from an inefficient or poisoned converter contain levels of non-combusted, non-methane hydrocarbons, oxides of nitrogen, and carbon monoxide. Such emissions are catalyzed by sunlight to form ground level ozone, more commonly referred to as smog.

Most of the sulfur in a hydrocarbon-containing fluid such as gasoline comes from thermally processed gasolines. Thermally processed gasolines such as, for example, thermally cracked gasoline, visbreaker gasoline, coker gasoline and catalytically cracked gasoline (hereinafter collectively referred to as "cracked-gasoline") contains, in part, olefins, aromatics, sulfur, and sulfur-containing compounds.

Since most gasolines, such as for example automobile gasolines, racing gasolines, aviation gasolines, boat gasolines, and the like contain a blend of, at least in part, cracked-gasoline, reduction of sulfur in cracked-gasoline will inherently serve to reduce the sulfur levels in most gasolines such as, for example, automobile gasolines, racing gasolines, aviation gasolines, boat gasolines, and the like.

The public discussion about gasoline sulfur has not centered on whether or not sulfur levels should be reduced. A consensus has emerged that lower sulfur gasoline reduces automotive emissions and improves air quality. Thus, the real debate has focused on the required level of reduction, the geographical areas in need of lower sulfur gasoline, and the time frame for implementation.

As the concern over the impact of automotive air pollution continues, it is clear that further efforts to reduce the sulfur levels in automotive fuels will be required. While the current gasoline products contain about 330 parts per million (ppm), the U.S. Environmental Protection Agency recently issued regulations requiring the average sulfur content in gasoline to be less than 30 ppm average with an 80 ppm cap. By 2006, the standards will effectively require every blend of gasoline sold in the United States to meet the 30 ppm level.

Desulfurization preferably has a minimal effect on the olefin content of such fuels so as to maintain the octane number (both research and motor octane number). Such a process would be desirable since saturation of olefins greatly affects the octane number. Such adverse effect on olefin content is generally due to the severe condition normally employed, such as during hydrodesulfurization, to remove thiophenic compounds (such as, for example, thiophenes, benzothiophenes, alkyl thiophenes, alkylbenzothiophenes, alkyl dibenzothiophenes and the like) which are some of the most difficult sulfur-containing compounds to be removed from cracked-gasoline. In addition, there is a need to avoid a system wherein the conditions are such that the aromatic content of the cracked-gasoline is also lost through saturation. Thus, there is a need for a process wherein desulfurization is achieved and the octane number is maintained.

There is also a need to reduce the sulfur content in diesel fuels. In removing sulfur from diesel fuels by hydrodesulfurization, the cetane is improved but there is a large cost in hydrogen consumption. Such hydrogen is consumed by both hydrodesulfurization and aromatic hydrogenation reactions.

Conventional desulfurization requires a significant consumption of hydrogen and has poor economical performance process for the treatment of cracked gasolines and diesel fuels.

As a result of the lack of success in providing a successful and economically feasible process for the reduction of sulfur levels in cracked-gasolines and diesel fuels, it is apparent that there is still a need for a better process for the desulfurization of such hydrocarbon-containing fluids which has minimal effect on octane levels while achieving high levels of sulfur removal. Traditionally, sorbent compositions used in processes for the removal of sulfur from hydrocarbon-containing fluids have been agglomerates utilized in fixed bed applications. Because of the various process advantages of fluidized beds, hydrocarbon-containing fluids are sometimes used in fluidized bed reactors. Fluidized bed reactors have advantages over fixed bed reactors such as better heat transfer and better pressure drop. Fluidized bed reactors generally use reactants that are particulates. The size of these particulates is generally in the range of about 1 micron to about 1000 microns. However, the reactants used generally do not have sufficient attrition resistance for all applications. Consequently, finding a sorbent with sufficient attrition resistance that removes sulfur from these hydrocarbon-containing fluids and that can be used in fluidized, transport, moving, or fixed bed reactors is desirable and would be of significant contribution to the art and to the economy.

BRIEF SUMMARY OF THE INVENTION

The foregoing paragraphs have been provided by way of general introduction, and are not intended to limit the scope of the following claims. The described embodiments, together with further advantages, will be best understood by reference to the following detailed description taken in conjunction with the accompanying drawings.

In one embodiment of the present disclosure, an activated carbon/NiO/ZnO composite is synthesized via a thermal co-precipitation method.

In another embodiment, the activated carbon/NiO/ZnO composite has a surface area of about 38.9 $m^2/g$, a pore volume of about 0.507 $cm^3/g$, and an adsorption average pore width of about 521 Å.

In another embodiment, an activated carbon/ZnO composite is synthesized via a thermal co-precipitation method.

In another embodiment, the activated carbon/ZnO composite has a surface area of about 15.2 $m^2/g$, a pore volume of about 0.304 $cm^3/g$, and an adsorption average pore width of about 801 Å.

In another embodiment, the composites are used to adsorb and determine the sulfur-containing content in diesel fuel.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
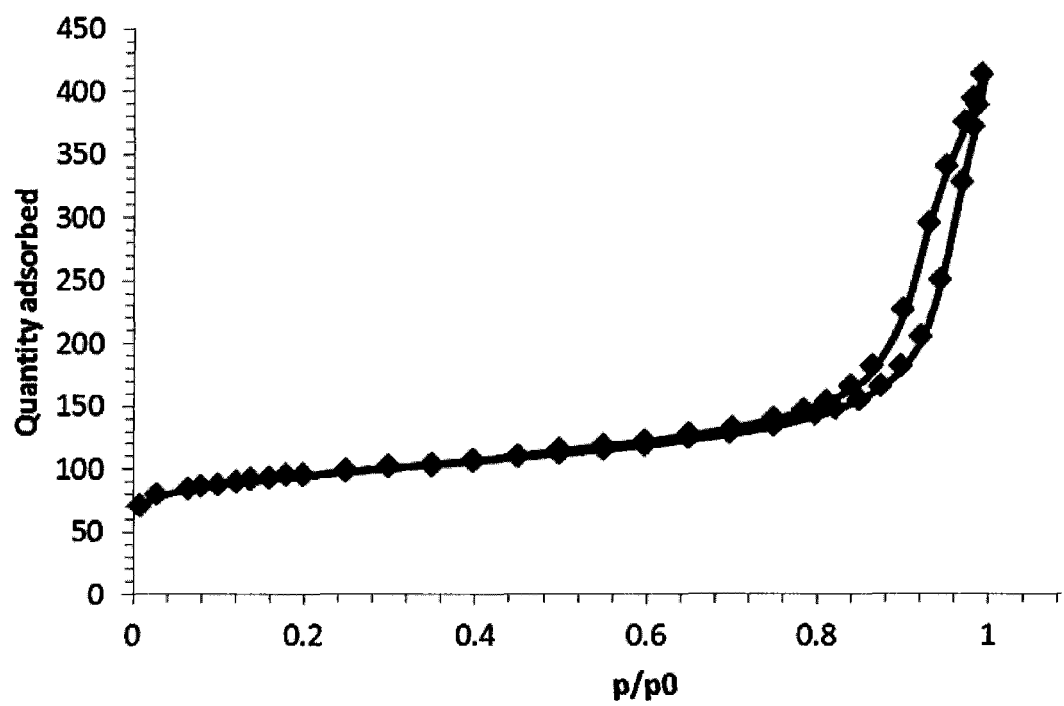
FIG. 1 is a graph of the Nitrogen adsorption/desorption isotherms for AC/NiO/ZnO.

Referring now to the drawings, wherein like reference numerals designate identical or corresponding parts throughout the several views.

The present invention relates to a thermal co-precipitation method for obtaining an activated carbon/NiO/ZnO material. The thermal co-precipitation method may further include thermal, chemical, and mechanical treatments to obtain the desired material.

First, an activated carbon (AC) is dispersed in a solvent. The activated carbon may be in the form of powdered activated carbon, granular activated carbon, extruded activated carbon, bead activated carbon, impregnated carbon, polymer coated carbon but is not limited to such forms of activated carbon. Preferably, the activated carbon is in the form of powdered activated carbon. The activated carbon is dispersed in a solvent. Preferably, the solvent is deionized water. The activated carbon may be added at a mass range of 0.01-15.0 g, 2.0-10.0 g, or 3.0-8.0 g per a volume of solution in the range of 100-200 mL, 125-175 mL, or 130-160 mL. Preferably, 6.0 g AC is added to a deionized water sample containing a volume of 150 mL. Further, the solution contains a mass concentration of activated carbon in the deionized water sample in the range of 0.01-0.5 g/mL, preferably in the range of 0.02-0.4 g/mL, 0.03-0.3 g/mL, or 0.04-0.2 g/mL. Preferably, the mass concentration of the activated carbon in the deionized water sample is 0.04 g/mL.

The solution of activated carbon and deionized water is then mixed. Manual methods of mixing may be used to mix the solution including but not limited to swirling the solution by hand and by placing a magnetic stir bar in the solution and stirring with a magnetic stir plate. Mechanical methods include but are not limited to sonicating the solution using an ultrasonic bath or an ultrasonic probe or ultrasonicating the solution. Preferably, ultrasonication is used. Ultrasonication in the presence of the deionized water enhances the absorbivity of the activated carbon nanoparticles by improving their dispersion within the deionized water and optimizes conditions for removal of the sulfur-containing compounds once they react with the solution during desulfurization. The solution is ultrasonicated at a frequency of >20 kHz, more preferably between 20-30 kHz. The ultrasonicator functions at a power within the range of 100-1500 W, 200-1300 W, or 300-800 W. More preferably, the ultrasonicator functions at a power between 300-800 W. The solution is ultrasonicated for a time period ranging from 30-100 minutes, 40-80 minutes, and 50-65 minutes. Preferably the solution is ultrasonicated for 60 minutes.

A solution containing a nickel compound, e.g., $Ni(NO_3)_2 \cdot 6H_2O$, is added to the dispersed activated carbon and deionized water solution. Other Ni salts include nickel sulfate ($NiSO_4$), nickel nitrate ($Ni(NO_3)_2$), nickel chloride ($NiCl_2$) and/or the mixtures of the same. $Ni(NO_3)_2 \cdot 6H_2O$ in a solution is added in the range of 0.5-2.5 g, 0.75-2.0 g, or 0.8-1.8 g per a volume of solution in the range of 10-100 mL, 25-75 mL, or 30-70 mL. Preferably, 1.763 g $Ni(NO_3)_2 \cdot 6H_2O$ in a solution of 50 mL is added to the dispersed activated carbon and deionized water solution to create a mixture. The mixture is then stirred over a time period in the range of 1-3 hours, 1.5-2.5 hours, or 1.75-2.25 hours. Preferably, the mixture is stirred for 2 hours. The mixture is then further stirred for an additional 6 hours and heated at a range of 75-100° C., 80-95° C., or 85-92° C. Preferably, the mixture is stirred for 6 hours and heated up to 90° C. so that the pH of the mixture is maintained between a pH of 8 and 9. Heating and stirring of the mixture results in a precipitate. The precipitate is then filtrated from the mixture, washed, and dried at a temperature in the range of 90-125° C., 100-120° C., or 105-115° C. over a time period of 6-15 hours, 6-14 hours, or 7-13 hours. Preferably, the precipitate is dried at 110° C. over a time period of 12 hours.

Following drying, the precipitate is then dispersed in an aqueous sample of deionized water. The deionized water includes a volume in the range of 100-200 mL, 125-175 mL, or 130-170 mL. Preferably, 150 mL deionized water is used.

A solution containing a zinc compound, e.g., $Zn(NO_3)_2 \cdot 6H_2O$, is added to the solution of deionized water and precipitate. Other Zn compounds include zinc carbonate ($ZnCO_3$), zinc sulfate ($ZnSO_4$) and zinc chloride ($ZnCl_2$). $Zn(NO_3)_2 \cdot 6H_2O$ in a solution is added in the range of 1.0-8.0 g, 2.0-7.5 g, or 3.0-7.0 g per a volume of solution in the range of 10-100 mL, 25-75 mL, or 30-70 mL. Preferably, 6.975 g $Zn(NO_3)_2 \cdot 6H_2O$ in a solution of 50 mL is added dropwise to the solution of deionized water and precipitate sample to create a second mixture. The second mixture is then stirred over a time period in the range of 1-3 hours, 1.5-2.5 hours, or 1.75-2.25 hours. Preferably, the second mixture is stirred for 2 hours. The second mixture is then further stirred for an additional 6 hours and heated at a range of 75-100° C., 80-95° C., or 85-92° C. Preferably, the second mixture is stirred for 6 hours and heated up to 90° C. so that the pH of the second mixture is maintained between a pH of 8 and 9. Heating and stirring of the mixture results in a second precipitate. The second precipitate is then filtrated, washed, and dried at a temperature in the range of 90-125° C., 100-120° C., or 105-115° C. over a time period of 6-15 hours, 6-14 hours, or 7-13 hours. Preferably, the second precipitate is dried at 110° C. over a time period of 12 hours.

Heating and drying the second precipitate forms a product. The product is then calcined at a temperature in the range of 300-400° C., 325-375° C., or 330-360° C. over a time period of 2-5 hours, 2.5-4.5 hours, or 3-4.25 hours. Preferably, the product is calcined at 350° C. over 4 hours. Calcination yields the adsorbent AC/NiO/ZnO at a ratio of 12:1:4%.

The resulting material contains a mixture of an AC/NiO/ZnO. The preferred material composition includes but is not limited to the following compositional ranges: 5-25% activated carbon, 50-95% NiO, and 0-25% ZnO or 10-50% activated carbon, 50-100% NiO, and 40-50% ZnO or 15-30% activated carbon, 70-95% NiO, and 15-30% ZnO or 5-20% activated carbon, 80-95% NiO, and 5-20% ZnO or 0-20% activated carbon, 80-100% NiO, and 0-20% ZnO in which percent composition is calculated based on the molecular weight of each material. The surface area of the AC/NiO/ZnO material is in the range of 20-45 $m^2/g$, 25-40 $m^2/g$, and 30-40 $m^2/g$. Preferably the surface area of the AC/NiO/ZnO material is about 38.9 $m^2/g$. The pore volume is defined as the spaces in a material, and the fraction of the volume of voids over the total volume of the AC/NiO/ZnO is in the range of 0.05-1 $cm^3/g$, 0.4-0.8 $cm^3/g$, and 0.45-0.6 $cm^3/g$. Preferably, the pore volume of the AC/NiO/ZnO is about 0.507 $cm^3/g$. The adsorption average pore width of the AC/NiO/ZnO material is 500-600 Å, 510-590 Å, and 515-530 Å. Preferably, the adsorption average pore width of the AC/NiO/ZnO material is 521 Å.

Nitrogen sorption isotherms were performed at liquid nitrogen temperature (−196° C.) on a Micromeritics ASAP 2020 volumetric instrument to determine surface area (BET), pore volume and pore size distribution of tested sorbents.

EXAMPLE

Method of Preparing AC/NiO/ZnO

Thiophene ($C_4H_4S$, 99%, 84.14 g/mol), Benzothiophene (BT) ($C_8H_6S$, 99%, 134.2 g/mol), Dibenzothiophene (DBT) ($C_{12}H_8S$, 99%, 184.26 g/mol) obtained from Aldrich. N-Hexane ($C_6H_{14}$, 97%, 86.18 g/mol), Toluene ($C_7H_8$, 99.7%, 92.14 g/mol.

Activated Carbon (AC) was produced by hydrolysis process. Briefly, a waste materials was cleaned and ground. The granules were heated up to 300° C. to separate the produced oil; then to 500° C. for 3 h for carbonization, then at 900° C. for 2 h, for further development of the porosity of the activated carbon. Further modification was accomplished via $H_2O_2$ and $HNO_3$ treatment in order to develop oxygen surface groups on the carbon. Then, the product referred as AC was washed and dried at 100° C.

The adsorbent AC/NiO/ZnO (12:1:4%) was prepared via thermal co-precipitation. Briefly, 6.0 g of AC was dispersed in 150 mL of deionized water by the use of sonicator. Then, 50 mL solution containing 1.763 g of $Ni(NO_3)_2 \cdot 6H_2O$ was added into the dispersed AC. This mixture was stirred for 2. The pH of the mixture was maintained at 8-9 followed by heating up to 90° C. for 6 h under stirring. The precipitate was then filtrated, washed and dried at 110° C. overnight. The material was dispersed in 150 mL deionized water. Then, a 50 mL solution containing 6.975 g of $Zn(NO_3)_2 \cdot 6H_2O$ was dropwise added into that. This mixture was stirred for 2. The pH of the mixture was maintained at 8-9 followed by heating up to 90° C. for 6 h under stirring. The precipitate was then filtrated, washed and dried at 110° C. overnight. The product was calcined at 350° C. for 4 h.

Another embodiment of the invention includes a thermal co-precipitation method for obtaining an activated carbon (AC)/ZnO material. The thermal co-precipitation method may further include thermal, chemical, and mechanical treatments to obtain the desired material.

First, an activated carbon (AC) is dispersed in a solvent. The activated carbon may be in the form of powdered activated carbon, granular activated carbon, extruded activated carbon, bead activated carbon, impregnated carbon, polymer coated carbon but is not limited to such forms of activated carbon. Preferably, the activated carbon is in the form of powdered activated carbon. The activated carbon is dispersed in a solvent. Preferably, the solvent is deionized water. The activated carbon may be added at a mass range of 0.01-15.0 g, 2.0-10.0 g, or 3.0-8.0 g per a volume of solution in the range of 100-200 mL, 125-175 mL, or 130-160 mL. Preferably, 6.0 g AC is added to a deionized water sample containing a volume of 150 mL. Further, the solution contains a mass concentration of activated carbon in the deionized water sample in the range of 0.01-0.5 g/mL, preferably in the range of 0.02-0.4 g/mL, 0.03-0.3 g/mL, or 0.04-0.2 g/mL. Preferably, the mass concentration of the activated carbon in the deionized water sample is 0.04 g/mL.

The solution of activated carbon and deionized water is then mixed. Manual methods of mixing may be used to mix the solution including but not limited to swirling the solution by hand and by placing a magnetic stir bar in the solution and stirring with a magnetic stir plate. Mechanical methods include but are not limited to sonicating the solution using an ultrasonic bath or an ultrasonic probe or ultrasonicating the solution. Preferably, ultrasonication is used. Ultrasonication in the presence of the deionized water enhances the absorbivity of the activated carbon nanoparticles by improving their dispersion within the deionized water and optimizes conditions for removal of the sulfur-containing compounds once they react with the solution during desulfurization. The solution is ultrasonicated at a frequency of >20 kHz, more preferably between 20-30 kHz. The ultrasonicator functions at a power within the range of 100-1500 W, 200-1300 W, or 300-800 W. More preferably, the ultrasonicator functions at a power between 300-800 W. The solution is ultrasonicated for a time period ranging from 30-100 minutes, 40-80 minutes, and 50-65 minutes. Preferably the solution is ultrasonicated for 60 minutes.

A solution containing a zinc compound, e.g., $Zn(NO_3)_2.6H_2O$ is added to the dispersed activated carbon and deionized water solution. Other Zn compounds include zinc carbonate ($ZnCO_3$), zinc sulfate ($ZnSO_4$) and zinc chloride ($ZnCl_2$). $Zn(NO_3)_2.6H_2O$ in a solution is added in the range of 1.0-8.0 g, 2.0-7.5 g, or 3.0-7.0 g per a volume of solution in the range of 10-100 mL, 25-75 mL, or 30-70 mL. Preferably, 6.975 g $Zn(NO_3)_2.6H_2O$ in a solution of 50 mL is added dropwise to the dispersed activated carbon and deionized water solution to create a mixture.

The mixture is then stirred over a time period in the range of 1-3 hours, 1.5-2.5 hours, or 1.75-2.25 hours. Preferably, the mixture is stirred for 2 hours. The mixture is then further stirred for an additional 6 hours and heated at a range of 75-100° C., 80-95° C., or 85-92° C. Preferably, the mixture is stirred for 6 hours and heated up to 90° C. so that the pH of the mixture is maintained between a pH of 8 and 9. Heating and stirring of the mixture results in a precipitate. The precipitate is then filtrated from the mixture, washed, and dried at a temperature in the range of 90-125° C., 100-120° C., or 105-115° C. over a time period of 6-15 hours, 6-14 hours, or 7-13 hours. Preferably, the precipitate is dried at 110° C. over a time period of 12 hours.

Heating and drying the precipitate forms a product. The product is then calcined at a temperature in the range of 300-400° C., 325-375° C., or 330-360° C. over a time period of 2-5 hours, 2.5-4.5 hours, or 3-4.25 hours. Preferably, the product is calcined at 350° C. over 4 hours. Calcination yields the adsorbent AC/ZnO.

The resulting material contains a mixture of an AC/ZnO. The preferred material composition includes but is not limited to the following compositional ranges: 1-25% activated carbon and 75-99% ZnO or 1-50% activated carbon and 50-99% ZnO or 25-50% activated carbon and 50-75% ZnO or 50-75% activated carbon and 25-50% ZnO or 10-20% activated carbon and 80-90% ZnO in which percent composition is calculated based on the molecular weight of each material. The surface area of the AC/ZnO material is in the range of 10-20 $m^2/g$, 11-18 $m^2/g$, and 12-17 $m^2/g$. Preferably the surface area of the AC/ZnO material is 15.2 $m^2/g$. The pore volume is defined as the spaces in a material, and the fraction of the volume of voids over the total volume of the AC/ZnO is in the range of 0.05-1 $cm^3/g$, 0.1-0.8 $cm^3/g$, and 0.15-0.4 $cm^3/g$. Preferably, the pore volume of the AC/ZnO is about 0.304 $cm^3/g$. The adsorption average pore width of the AC/ZnO material is 700-900 Å, 750-850 Å, and 775-825 Å. Preferably, the adsorption average pore width of the AC/ZnO material is 801 Å.

EXAMPLE

Method of Preparing AC/ZnO

Similarly, the adsorbent AC/ZnO was prepared in the absence of NiO solution. Briefly, the adsorbent AC/ZnO was prepared via thermal co-precipitation where 6.0 g of AC was dispersed in 150 mL of deionized water by the use of sonicator. A 50 mL solution containing 6.975 g of $Zn(NO_3)2.6H_2O$ was drop-wise added. This mixture was stirred for 2. The pH of the mixture was maintained at 8-9 followed by heating up to 90° C for 6 h under stirring. The precipitate was then filtrated, washed and dried at 110° C. overnight. The product was calcined at 350° C. for 4 h. Characterization; After the synthesis of the adsorbents, the characterization has been performed by the means of different techniques; $N_2$ adsorption (BET), X-ray diffraction spectroscopy (XRD), and Fourier Transform Infrared spectroscopy (FT-IR).

In another embodiment of the invention, the AC/NiO/ZnO and AC/ZnO materials are used as sorbents to adsorb sulfur-containing compounds by a method of desulfurization. The adsorption of sulfur-containing compounds includes but are not limited to dibenzothiopene (DBT), benzothiopene (BT), and thiopene.

In the method, the sulfur-containing compounds are adsorbed from a hydrocarbon-based composition such as model diesel fuel. A model diesel fuel solution is prepared by dissolving the sulfur containing compounds into a solvent. The solvent is prepared by mixing an aromatic-containing compound with an alkane. Preferably, the aromatic-containing compound contains at least one six-membered hydrocarbon ring with a $C_1$-$C_6$ alkyl group selected from the group consisting of methyl (—$CH_3$), ethyl (—$C_2H_5$), propyl (—$C_3H_7$), butyl (—$C_4H_9$), pentyl (—$C_5H_{11}$), or hexyl (—$C_6H_{13}$) where said alkyl unit is attached to one of the carbon units of said hydrocarbon ring. Preferably, the alkyl group is methyl and more preferably the aromatic solvent used is toluene. The alkane is selected from a $C_1$-$C_6$ group consisting of methane ($CH_4$), ethane ($C_2H_6$), propane ($C_3H_8$), butane ($C_4H_{10}$), pentane ($C_5H_{12}$), and hexane ($C_6H_{14}$). More preferably, the alkane used is hexane.

Once the solvent is mixed, different amounts of the sorbents are introduced to a hydrocarbon. Preferably, 100-300 mg, 110-250 mg, and 150-200 mg of DBT, BT and thiopene is used per about 4 mL of hydrocarbon. The desired sorbent is introduced into the hydrocarbon containing the sulfur-containing compounds DBT, BT, and thiopene with an initial concentration in the range of 450-650 mg/L, 500-600 mg/L, or 550-595 mg/L. Preferably, the initial concentration of sulfur-containing compounds in the model diesel fuel is 500 mg/L.

The resultant mixture is then induced into equilibrium by shaking at room temperature. Samples are then taken from the mixture at time intervals of 0, 10, 20, 30, 40, 50, 60 and 80 minutes of time to be analyzed by GC-SCD method.

The activated carbon/NiO/ZnO sorbent proved to be more effective in removing sulfur-containing compounds in the process of desulfurization when compared to the activated carbon/ZnO sorbent. The presence of nickel enhances the efficiency of the activated carbon/NiO/ZnO sorbent in desulfurization.

Typically, various amounts, in the range between 0.05 to 0.75 g of adsorbent was introduced into 50 mL of the fuel solution. The total DBT, BT and Thiophene initial concentrations was 500 mg/L, prepared by dissolving 166.5 mg DBT, 166.5 mg BT and 166.5 mg Thiophene in 1 L solvent (762 ml toluene+238 ml hexane). Thus, the amount of sulfur calculated in the fuel was 63.435 ppm, 39.783 ppm and 28.975 ppm, respectively.

The resulting mixture was continuously shaken at room temperature until equilibrium. Aliquots were taken from the system at the pre-determined time intervals and analyzed by GC-SCD method.

Dynamic adsorption experiments were carried out by passing the fuel sample through a fixed bed at ambient temperature and constant flow rate in order to determine the adsorption capacity. The various dimensions of the adsorption column were used with various volumes of fuel samples. In brief, a column was packed with the adsorbent. Model fuel was passed through the column packed with adsorbent by peristaltic pump with a controlled flow rate. Once the adsorption process was started, aliquots of the outlet were collected at different time intervals and injected in the GC for analysis. The process was stops once the breakthrough point has been reached.

GC-SCD Method of Analysis; The concentration of DBT, BT and thiophene in solution was analyzed by Agilent Gas Chromatograph with a Sulfur Chemiluminescence Detector (GC-SCD). The GC was equipped with splitless injection port and operated using splitless mode. Separated done in DB-1 column with 30 m length and 0.32 mm diameter and the injection volume was 0.1 ul with flow rate 1.1 ml\min, oven (column) temperature 280° C. Since the detector detect the sulfur we used the following equation to calculate the relative amount of analayte ppm of sulfur=amount of thiophenic compound (mg)× [molar mass of sulfur\molar mass of thiophenic compound]

The percentage removal of sulfur was calculated using the following equation:

Percentage sulfur removal=$[(C_o-C_e)\backslash C_o]*100$

Where $C_o$ is the initial sulfur concentration (mg/L), Ce is the sulfur concentration (mg/L) at equilibrium. The analyte adsorption (qe, mg/g) at equilibrium, was calculated using the following equation:

$qe=(Co-Ce)Vw$

Co (mg/L) and Ce (mg/L) are the sulfur compound concentrations contained in the initial solution and at equilibrium, respectively; V (L) is the volume of the fuel solution; and w (mg) represents the weight of adsorbents.

The regeneration of the sorbents was investigated after they were saturated by thiophenic compounds. For the regeneration, Used sorbents were treated by Toluene and heating at 300° C. for 3 h. The desorbed amounts of thiophenic compounds were analyzed as a function of time with GC-SCD. Also, the used adsorbents were regenerated thermally only by heating at 350° C. for 3 h.

All sorbents show major nitrogen uptake at relative pressures less than 0.25. FIG. 1 is a graph that illustrates the Nitrogen adsorption/desorption isotherms for AC/NiO/ZnO at −196° C. This means that the adsorbents are microporous. As well as, a small hysteresis loop can also be observed at high relative pressures indicating the presence of mesopores (K. Sing, et al., *Pure Appl Chem,* 57, 603, 1985—incorporated herein by reference in its entirety).

Table 1 shows the pore volume of the prepared adsorbents follow the order AC>AC\NiO\ZnO>AC\ZnO. This could be attributed to occupied the pore volume by loaded NiO and ZnO species. In addition, BET surface area a follow the order AC>AC\NiO\ZnO>AC\ZnO. This means that, the specific surface area (BET) and the total pore volumes decreased upon loaded NiO and ZnO functional groups which were introduced as the chemical modification (Seredych, et al 2010) and (Jiang et al 2003) (Z. Jiang, et al., *Langmuir,* 19, 731-736, 2003—incorporated herein by reference in its entirety).

TABLE 1

BET Surface area and pore volume analysis

| Adsorbents | BET surf. area (m2/g) | pore vol (cm3/g) | Adsorption average pore width Å |
| --- | --- | --- | --- |
| AC | 62.3489 | 0.959211 | 615.3830 |
| AC\NiO\ZnO | 38.8997 | 0.506763 | 521.0974 |
| AC\ZnO | 15.1786 | 0.304183 | 801.6115 |

Figure 2:
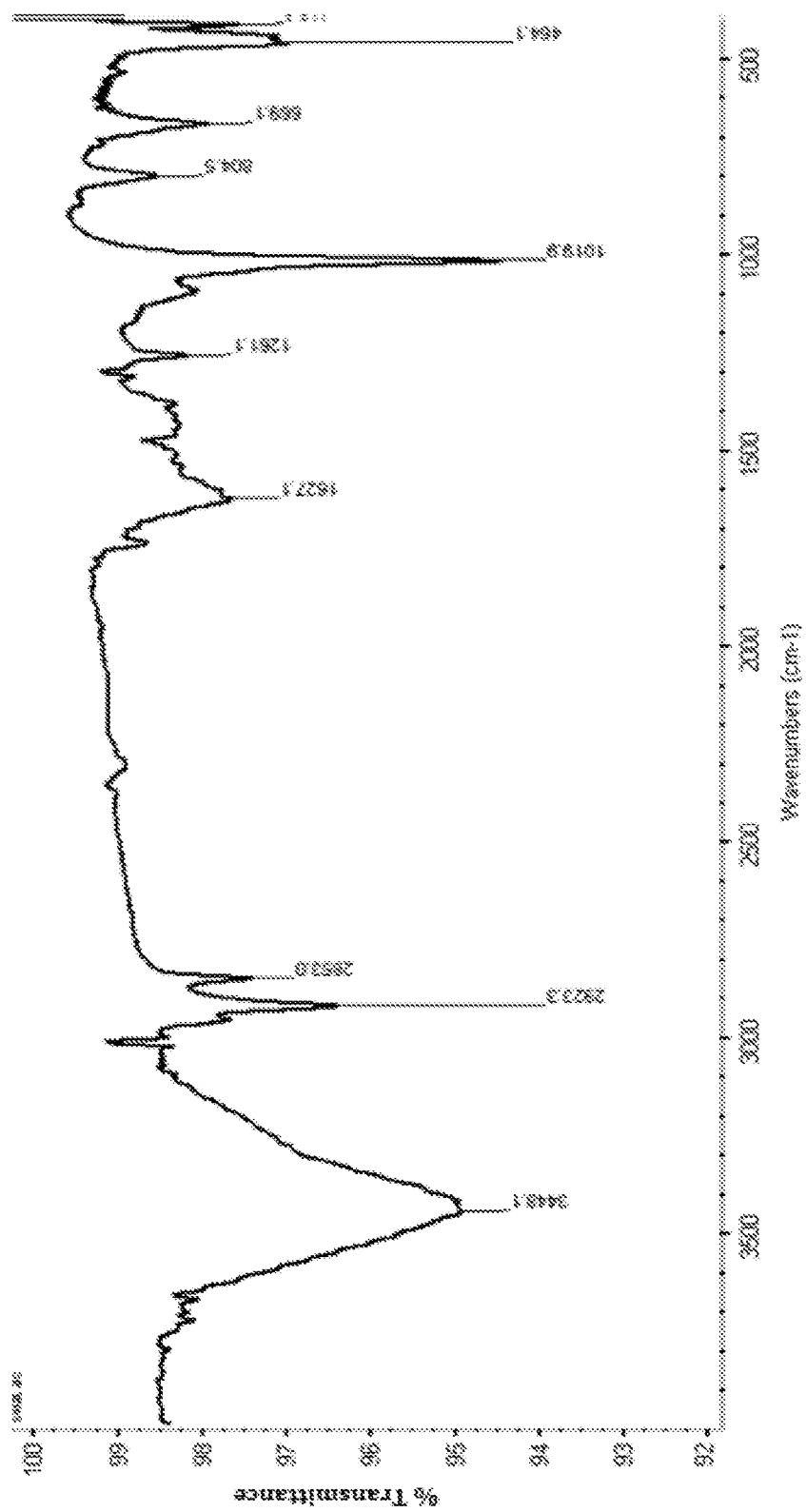
FIG. 2 is FT-IR spectra of AC/NiO/ZnO.

Example of FTIR is presented in FIG. 2 for AC\NiO\ZnO. There are bands at 490 cm-1 and ~455 cm-1 that may attributed to the stretching mode of ZnO and of NiO stretching vibrational mode respectively.

Figure 3A:
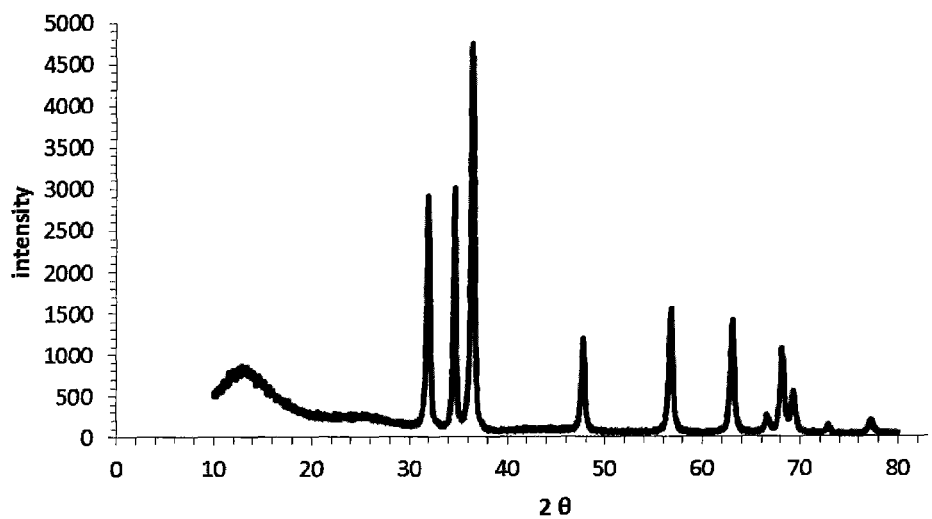
FIGS. 3A-3B are XRD spectrograms of AC/NiO/ZnO and AC/ZnO, respectively.
Figure 3B:
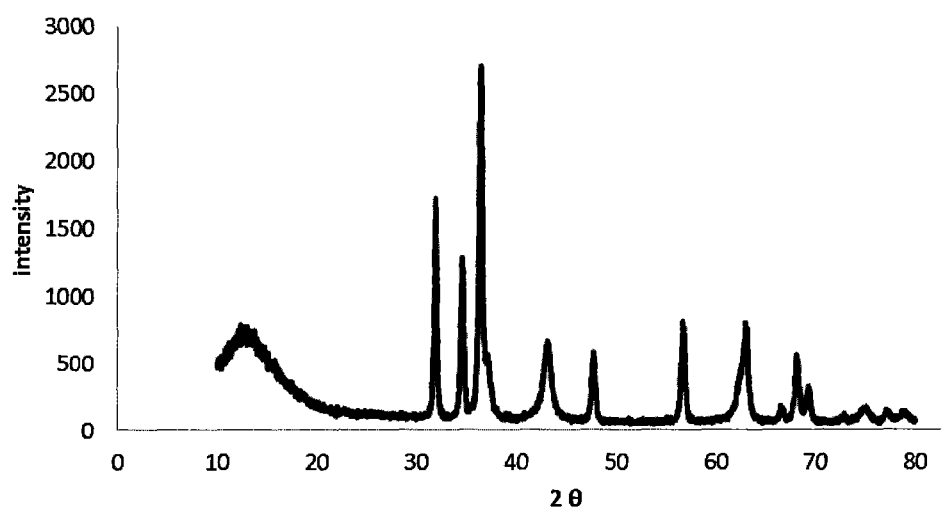

The XRD spectra of the activated carbon sample indicates the presence of exist three broad diffraction peaks located at 2θ=20-30 and 40-50, revealing the presence of amorphous carbon which is disorderly stacked up by carbon rings (Y. b. Tang et al., *Chemical Engineering Journal,* 203, 19-24, 2012—incorporated herein by reference in its entirety). For the AC/ZnO/Ni and AC/ZnO composites new peaks are appeared in different 2theta with different intensity as show in FIGS. 3A and 3B.

Figure 4:
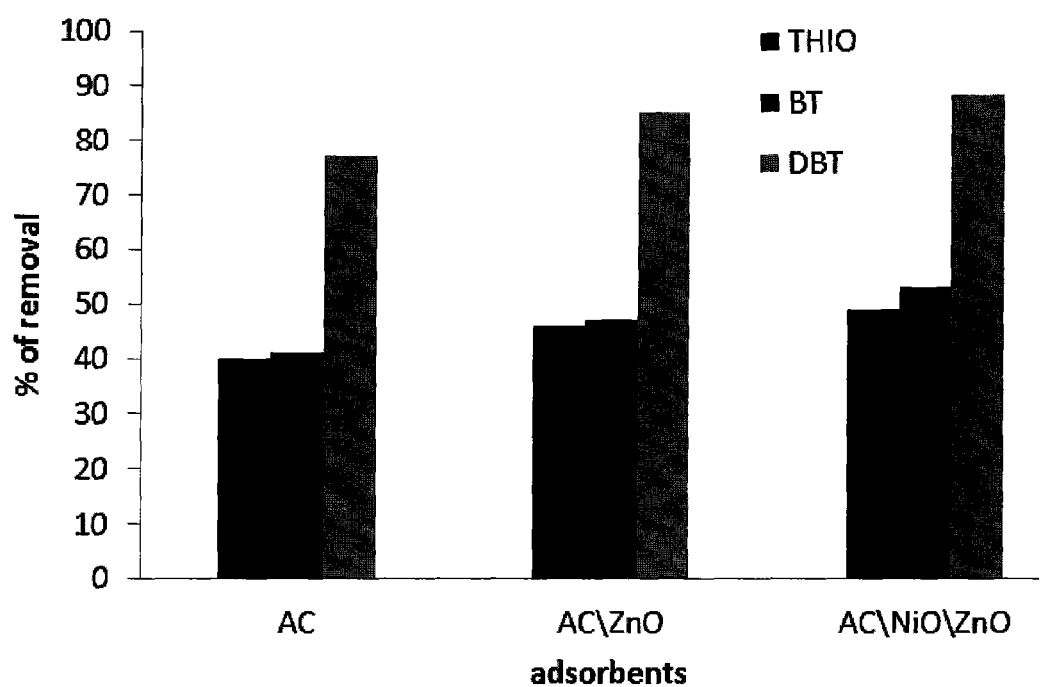
FIG. 4 is a graph of the percentage removal of thiopene, BT, and DBT.

For comparing constant amount (0.75 g) from each adsorbent was added to three different flasks each one contains the same concentration of sample (500 ppm in 50 ml solvent). The flasks were stirred for 80 minutes then samples were taken from each one an analyzed by GC-SCD. The results given in FIG. 4 present the percentages of removal for thiophene, BT and DBT using the three prepared adsorbents. FIG. 4 is a graph of percentage removal of thiophene, BT and DBT (initial concentration of each on is 166.6 ppm) on AC, AC\NiO\ZnO, AC\ZnO (dosage 0.75 g, 50 ml and time 50 min). It is obvious that, although, AC has larger BET surface area and pore volume than AC\NiO\ZnO, AC\ZnO (table 1), they exhibited higher adsorption capacity and percentages of removal, this could be attributed to another factor which is S-M interaction between sulfur and Ni and Zn (S. Velu, et al., Song, *Ind Eng Chem Res,* 42, 5293-5304, 2003—incorporated herein by reference in its entirety).

In addition, it is clear that AC\NiO\ZnO exhibited higher adsorption capacity for the three compounds which means that, the metal species located contribute to enhanced interactions. These results agree with previous reported that Nickel has an affinity to the organic sulfur compounds and it is the active sites on Ni/ZnO for desulfurization process (E. S. Moosavi, et al., *Energies,* 5, 4233-4250, 2012—incorporated herein by reference in its entirety).

The following adsorption capacity in the order: AC\NiO\ZnO>AC\ZnO>AC.

The adsorption properties (adsorption capacity and selectivity) of the adsorbents did not determined by their porosity (adsorption pore volume) but also affected by the chemical property of their surfaces, which is corresponded to the previous studies also (X. Li, et al., *Adsorpt. Sci. Technol.*, 24, 363-369, 2006—incorporated herein by reference in its entirety).

Figure 5:
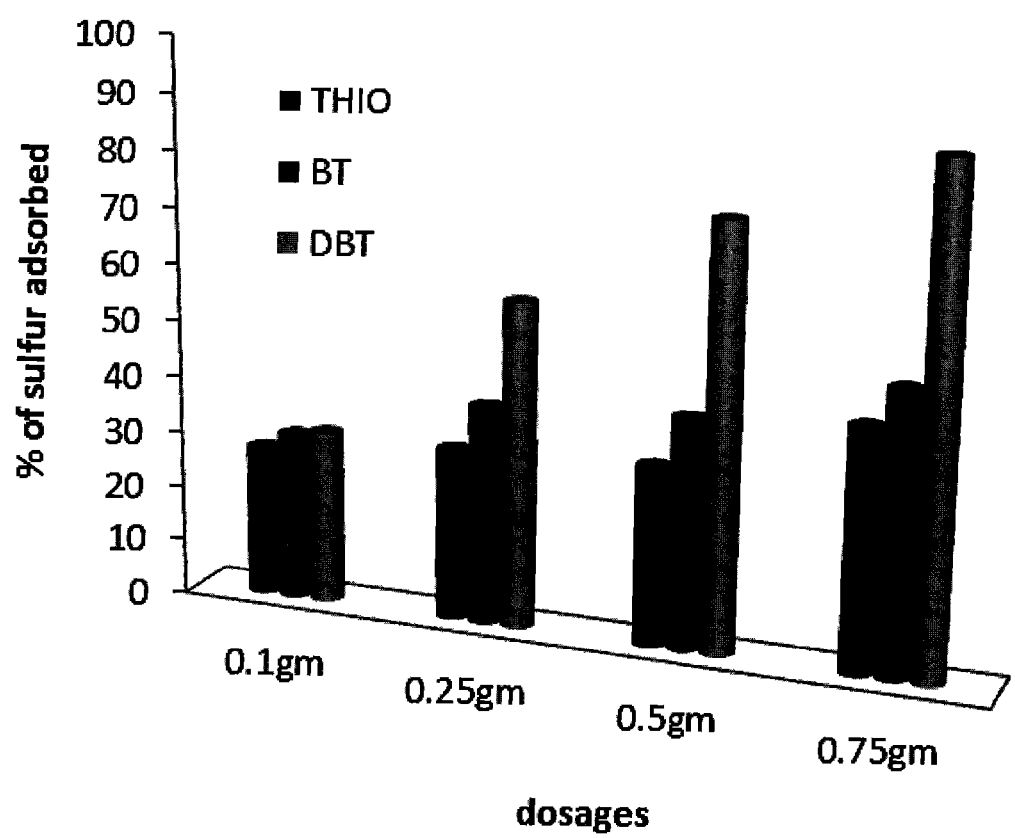
FIG. 5 is a graph depicting the effect of adsorbent dosage of the adsorption of thiopene, BT, and DBT.

The efficiency of sulfur removal is significantly influenced by the amount of adsorbent used. The amounts of thiophene, BT and DBT adsorbed onto the adsorbents are depicted in FIG. 5. FIG. 5 is a graph that depicts the effect of adsorbent dosage on the adsorption of thiophene, BT and DBT, on AC\NiO\ZnO (50 ml with initial concentration 190, 190 and 197 ppm respectively) with a contact time of 50 min. A trend of increment in adsorption capacity with increment in adsorbent dose was observed from 0.1 to 0.75 g. The results indicate that the amount of sulfur compounds adsorbed by the adsorbent increased with increasing the amount of the adsorbent. The initial increase in adsorption capacity with increase in adsorbent dosage was expected because the increase in the number of adsorbent particles results in more surface area and more adsorption sites (Srivastav et al 2009) available for sulfur compounds attachment.

DBT exhibits higher percentage of removal for each dosage and on all adsorbents due to the ability of DBT to form $\pi$-$\pi$ dispersive interactions between the aromatic ring in DBT and the graphene layers on AC. This also can explain that the molecules with three-aromatic rings (DBT) showed a significantly higher adsorptive affinity than two-ring aromatics (BT) and higher than one ring (thiophene) (Bu et al 2011).

Figure 6:
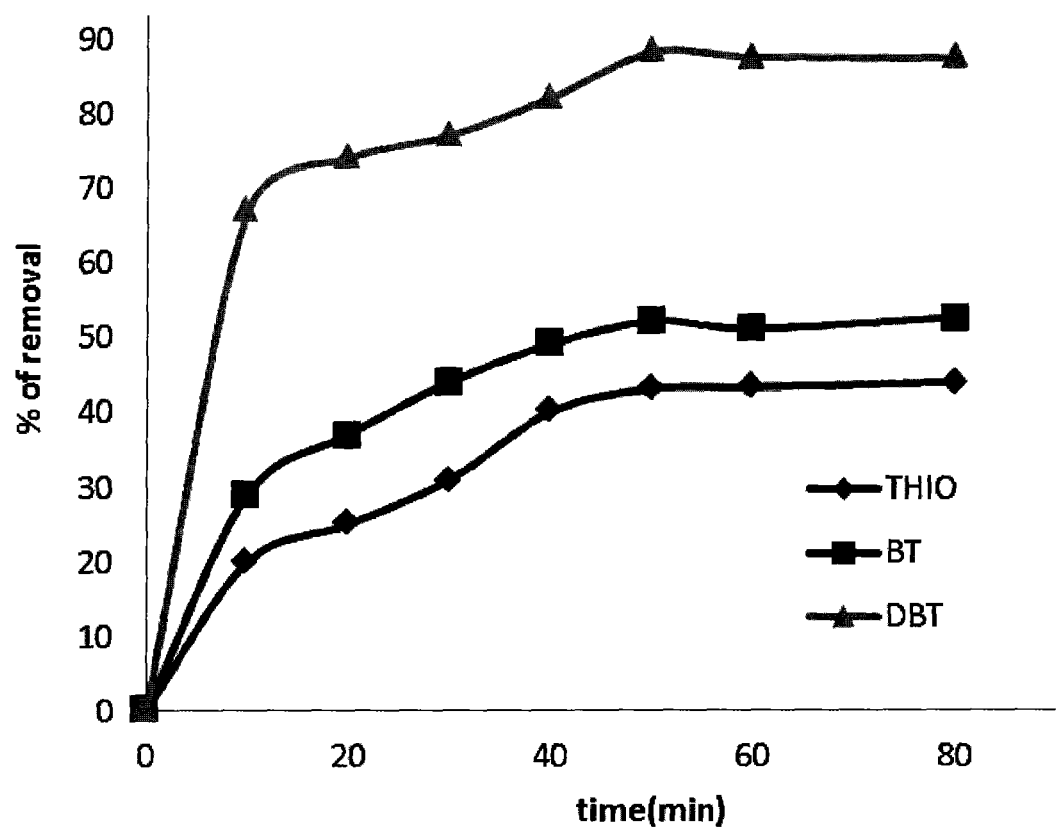
FIG. 6 is a graph of the adsorption of sulfur compounds on AC/NiO/ZnO at different time intervals.

The effect of contact time on the amount of sulfur compounds adsorbed was investigated and the data are presented in FIG. 6. FIG. 6 is a graph of the adsorption of sulfur compounds on AC\NiO\ZnO at different time intervals; conditions dosage is 0.75 g, (with initial concentration 190, 190 and 197 ppm respectively) in batch mode.

The extent of removal of sulfur by AC\NiO\ZnO was found to increase, reach a maximum value with increase in contact time. In some cases it decreases with the increase in contact time after, 50 min which may be due to a desorption process. The rate and quantity of sulfur adsorbed by the adsorbent is limited by the size of adsorbent molecules, concentration of adsorbate and its affinity towards the adsorbent, diffusion coefficient of the adsorbent in the bulk and solid phase and the degree of mixing. With increasing contact time, the number of available adsorption sites decreased as the number of sulfur ions adsorbed increased.

A large number of vacant surface sites are available for adsorption during the initial stage, and after a lapse of time, the remaining vacant surface sites are difficult to be occupied due to repulsive forces between the solute molecules on the solid and bulk phases (S. Kumar et al., *Fuel*, 90, 3209-3216, 2011—incorporated herein by reference in its entirety).

Besides, the DBT, BT, thiophene (as sulfur) are absorbed into the micro- and meso-pores that get almost saturated with DBT, BT, thiophene during the initial stage of adsorption. Thereafter, the DBT, BT, Thiophene molecules have to traverse further and deeper into the micro-pores encountering much larger resistance. This results in the slowing down of the adsorption rate during later period.

Adsorption break through curves were generated by plotting the transient total sulfur concentration normalized by the feed total sulfur concentration (Ct/Co) vs. cumulative time. The breakthrough for thiophene on AC\NiO\ZnO, AC\ZnO and AC. The initial concentration was 166 ppm and it decreased to 50, 55 and 110 ppm in the first 10 minutes by AC\NiO\ZnO, AC\ZnO and AC respectively and it came back to the initial concentration after three hours this means that no more adsorption happened after three hours.

Figure 7:
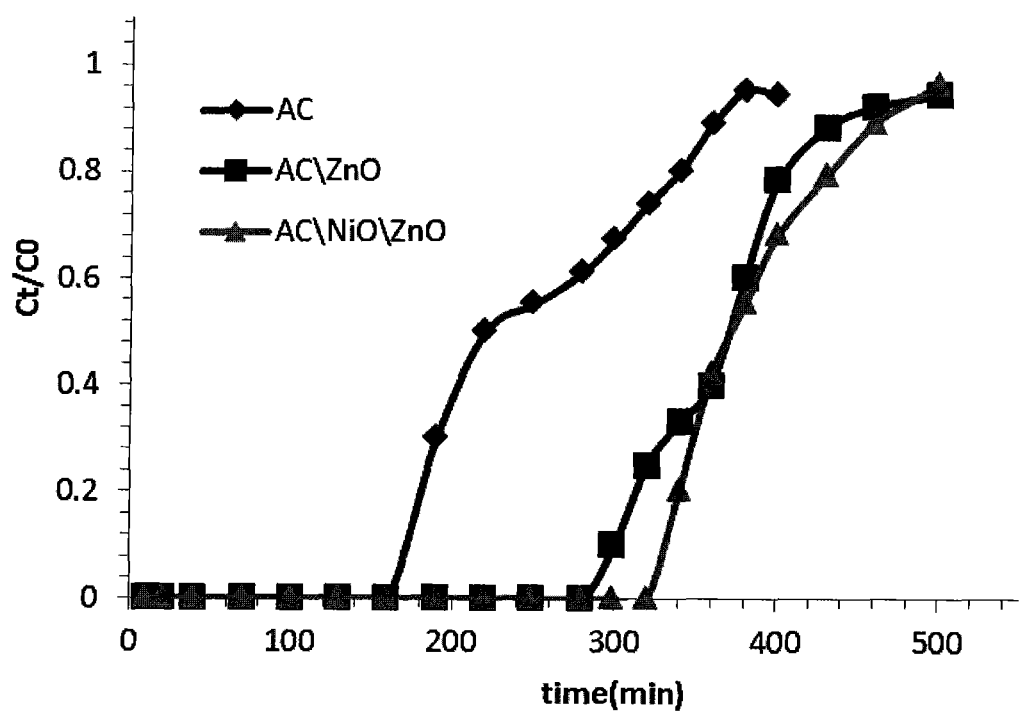
FIG. 7 is a graph of the breakthrough curves of DBT on AC/NiO/ZnO, AC/ZnO, and AC.

AC\NiO\ZnO, AC\ZnO and AC exhibited better capacity for BT than thiophene, and though the initial concentration of BT was 166 ppm it declined significantly to less than 0.05 ppm in the first 10 min treatment by AC, AC\ZnO and AC\NiO\ZnO respectively and then increased gradually for 300 min until it returned to the initial concentration. FIG. 7 is a graph of the breakthrough curves of DBT with initial concentration 166 ppm on AC\NiO\ZnO, AC\ZnO and AC (column mode). The absorption capacity for BT in column mode follow the order AC\NiO\ZnO>AC\ZnO>AC. The highest adsorption capacity for DBT was on AC\NiO\ZnO adsorbent where there was no peak appears for DBT and the DBT became zero during the initial 320 min. After 320 minutes sulfur appeared in the sample with low concentration and returned to the initial concentration after six hours.

The breakthrough points are of the order DBT>BT>thiophene in the order of adsorbents order AC\NiO\ZnO>AC\ZnO>AC. These results indicated that AC\NiO\ZnO>AC\ZnO>AC are suitable for removal of thiophene, BT and DBT in column systems.

Two methods were developed for regeneration of the composites.
i. solvent followed by heating at 300° C. and
ii. thermally method in which the spent sorbents were heated at 350° C. for 3 h In (i), appropriate solvent like toluene was passed through the column packed with the spent sorpents by pump with constant flow rate. Aliquots of the eluent was collected in different intervals and analyzed by GC-SCD. The amount of thiophene and dibenzothiophene decreased with times, which indicate faster release of thiophene and BT comparing with DBT. This trend confirms the higher ability of DBT, to form $\pi$-$\pi$ complex between $\pi$ electrons of benzene rings and active sites on an activated carbon surface, than the BT and thiophene.

In (ii), sorbents were heated at appropriate temperature say at 350° C.

Figure 8:
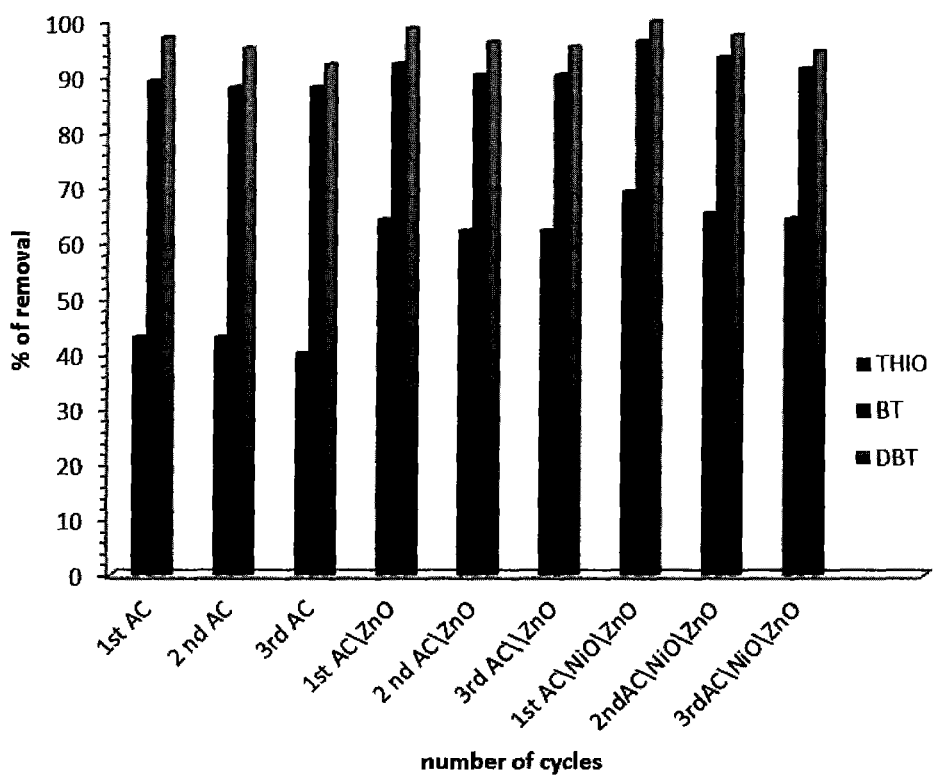
FIG. 8 is a graph depicting the percentage removal of thiopene, BT, and DBT from model diesel fuel by AC/NiO/ZnO, AC/ZnO, and AC in three cycles.

FIG. 8 is a graph that depicts the percentages of removal of thiophene, BT and DBT from model diesel by AC\NiO\ZnO, AC\ZnO, and AC in three cycles,: where $2^{nd}$ is regeneration by solvent and heat, while $3^{rd}$ regeneration only by heating at 350° C. for 3 h. (After 10 minutes adsorption process) on column mode.

Adsorption by means of using porous materials is considered to be promising approach. Three different materials; Activated Carbon (AC) from waste materials, Activated carbon\Nickel oxide\Zinc oxide (AC\NiO\ZnO) and Activated carbon\Zinc oxide (AC\ZnO), were prepared and used as adsorbents for removal of Thiophene, benzothiophene (BT) and dibenzothiophene (DBT) as sulfur compounds from model diesel. The prepared materials were characterized by N2-adsorption, X-ray diffraction and Fourier Transform Infrared spectroscopy (FTIR). The following adsorption capacity for the three compounds in the order: AC\NiO\ZnO>AC\ZnO>AC, while the amount of compounds adsorbed follow the order DBT>BT>thiophene. Adsorption capacity is governed by chemical interaction and pore volume of the adsorbents. Obtained results indicate that the sorbents exhibited an efficient and economical way for removing sulfur compounds due to its low-energy consumption, ambient operation temperature and atmospheric pressure; rather, there was a simple regeneration method of the spent adsorbents.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A method for obtaining an activated carbon/NiO/ZnO material, comprising:
    dispersing an activated carbon in a solvent and sonicating to form a first mixed solution;
    mixing a nickel salt solution with the first mixed solution to form a second mixed solution;
    heating and stirring the second mixed solution to precipitate a first precipitate;
    dispersing the first precipitate in a solvent and mixing with a zinc salt solution to form a second mixture;
    heating and stirring the second mixture to precipitate a second precipitate;
    calcining the second precipitate to form an activated carbon/NiO/ZnO material having a surface area in the range of 20-45 $m^2/g$, a pore volume in the range of 0.05-1 $cm^3/g$, and an adsorption average pore width in the range of 500-600 Å.

2. The method of claim 1 in which the solvent is deionized water.

3. The method of claim 1 in which the activated carbon is powdered activated carbon.

4. The method of claim 1 in which the pH of the second mixture is maintained within the range of 8-9 during heating and stirring.

5. An activated carbon/NiO/ZnO material in which the material has a surface area of about 38.9 $m^2/g$, a pore volume of about 0.507 $cm^3/g$, and an adsorption average pore width of about 521 Å.

6. A method for obtaining an activated carbon/ZnO material, comprising:
    dispersing an activated carbon in a solvent and sonicating to form a first mixed solution;
    mixing a zinc salt solution with the first mixed solution to form a second mixed solution;
    heating and stirring the second mixed solution to precipitate a precipitate;
    calcining the precipitate to form an activated carbon/ZnO material having a surface area in the range of 10-20 $m^2/g$, a pore in the range of 0.05-1 $cm^3/g$, and an adsorption average pore width in the range of 700-900 Å.

7. The method of claim 6 in which the solvent is deionized water.

8. The method of claim 6 in which the activated carbon is powdered activated carbon.

9. The method of claim 6 in which the pH of the second mixed solution is maintained within the range of 8-9 during heating and stirring.

10. An activated carbon/ZnO material in which the material has a surface area of about 15.2 $m^2/g$, a pore volume of about 0.304 $cm^3/g$, and an adsorption average pore width of about 801 Å.

11. A method for desulfurizing a hydrocarbon composition, comprising:
    contacting an activated carbon/NiO/ZnO material with the hydrocarbon composition to absorb one or more sulfur compounds present in the hydrocarbon composition on the activated carbon/NiO/ZnO material.

12. The method of claim 11 wherein the hydrocarbon composition is a mixture of an aromatic-containing compound and an alkane.

13. The method of claim 12 wherein the aromatic-containing compound is toluene and the alkane is hexane.

14. The method of claim 11 wherein the sulfur compounds are selected from the group consisting of dibenzothiopene, benzothiopene, and thiopene.

15. The method of claim 11 wherein the activated carbon/NiO/ZnO material is contacted with the hydrocarbon composition for 50 minutes.

* * * * *